Patented Jan. 15, 1929.

1,699,346

UNITED STATES PATENT OFFICE.

WILLIAM R. CHAPIN, OF INDIANAPOLIS, INDIANA.

METAL CEMENT.

No Drawing.   Application filed September 1, 1927.  Serial No. 217,011.

My invention relates to a cement for joining metals, more especially for joining pieces of steel, and it consists of a compound which by long experiment and considerable use I have discovered is particularly adapted for the purpose in that it not only secures a perfect union of the metals particularly where a high speed steel is joined with cheaper and tougher steel back, but forms such a union without black spots in the joints which have resulted from the use of other cements and are more or less objectionable.

For the purpose of this compound I use silico-manganese approximately 60%, ferro-silicon, approximately 10%, pure nickel in powdered form not to exceed 25% and powdered borax glass not to exceed 10% and which may be in a proportion as low as 5%.

As is well known silico-manganese is an article of commerce which contains about approximately 70% manganese, 20% silicon and the balance iron. The ferro-silicon used in said compound is what is commonly known in the trade as 15% ferro-silicon containing approximately 85% iron and 15% silicon.

All the elements in this compound are ground to a fine powder, about 80 to 100 mesh, before mixing and the mixing is done in a way to secure a strictly uniform compound as the result.

The surfaces to be joined are machined or ground until they are flat after which they are cleaned and a quantity of the compound is placed between them. The parts are then placed in juxta-position and heated while in such position until they have reached a temperature of approximately 2300° Fahrenheit. They are then carefully removed from a source of heat and the surfaces to be joined are pressed together in order to remove surplus compound. The parts are then allowed to cool.

In the use of this compound I have discovered that black spots in the joints commonly resulting from the use of other compounds are obviated and a stronger and better looking joint results. This follows from the fact that the borax glass content is reduced to a very small percentage of the whole while the addition of the other elements of the compound result in a cement which flows freely and completely fills up all inequalities, such as low places in the machining of the high speed metal and carbon steel preparatory to cementing. I have found that in the use of the compound containing borax glass substantially in excess of 10% black, or nearly black beads which form the black spots in the joint result, whereas with the cement made in accordance with the above named formula this objectionable feature is overcome.

Having thus fully described my said invention, what I claim as new and desire to secure by Letters Patent is:

1. A compound consisting of silico-manganese approximately 60%, ferro-silicon, approximately 10%, nickel in powdered form not to exceed 25%, powdered borax glass not to exceed 10%, all ground to a fine powder and mixed substantially in the proportions and in the manner set forth.

2. A compound comprising silico-manganese and ferro-silicon approximately 70%, nickel approximately 25%, and borax glass approximately 5%, substantially as set forth.

3. A compound adapted to be used in joining metals comprising silico-manganese approximately 60%, ferro-silicon approximately 10%, powdered nickel not to exceed 25%, powdered borax glass not to exceed 10%, all mixed substantially in the manner set forth.

4. A compound adapted to be used in the joining of metals comprising silico-manganese and ferro-silicon approximately 70%, nickel not to exceed 25%, and powdered borax glass not to exceed 10%, all reduced to a powder and mixed, substantially as set forth.

5. A compound adapted to be used in the joining of metals comprising silico-manganese and ferro-silicon, nickel approximately 25%, borax glass approximately 10%, all reduced to a powder and mixed, substantially as set forth.

6. A compound comprising silico-manganese approximately 60%, ferro-silicon approximately 10%, powdered borax glass approximately 5% and the remainder powdered nickel, all reduced to a powder and mixed, substantially as set forth.

In witness whereof, I have hereunto set my hand at Indianapolis, Indiana, this 23rd day of July, A. D. nineteen hundred and twenty-seven.

WILLIAM R. CHAPIN.